(No Model.)
H. W. KNOWLTON.
WHEELBARROW.
No. 314,185. Patented Mar. 17, 1885.
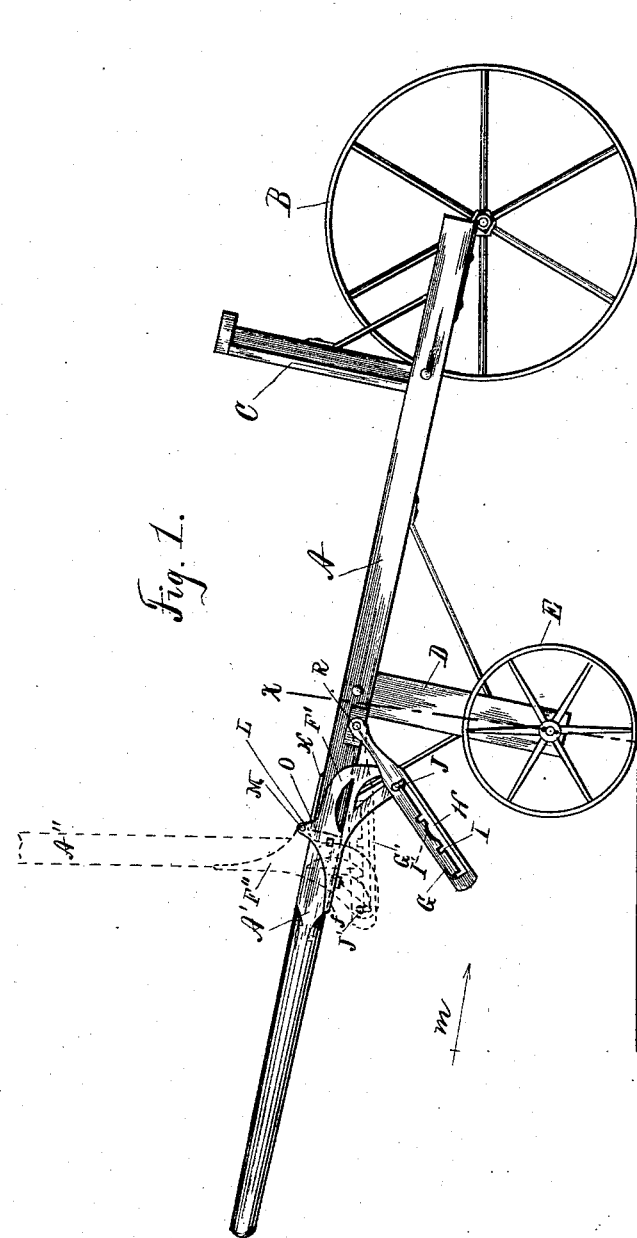
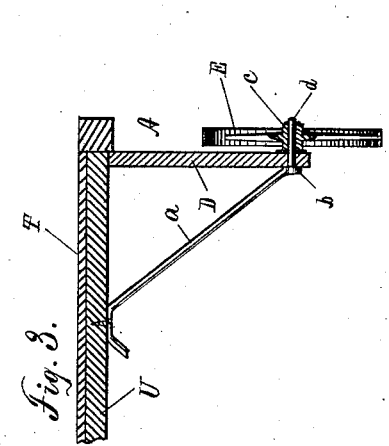
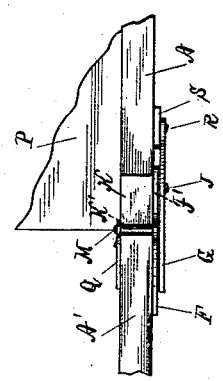
WITNESSES:
F. W. Brainard
Wallace Greene
INVENTOR
Homer W. Knowlton
BY
Robt. H. Wiles
ATTORNEY

UNITED STATES PATENT OFFICE.

HOMER W. KNOWLTON, OF PECATONICA, ILLINOIS.

WHEELBARROW.

SPECIFICATION forming part of Letters Patent No. 314,185, dated March 17, 1885.

Application filed May 5, 1884. (No model.)

*To all whom it may concern:*

Be it known that I, HOMER W. KNOWLTON, a resident of Pecatonica, in the county of Winnebago and State of Illinois, have invented certain new and useful Improvements in Wheelbarrows; and I do hereby declare the following to be a full, clear, and exact description of the invention, such as will enable others skilled in the art to which it pertains to make and use the same.

My invention relates to improvements in wheelbarrows and hand-trucks, and is fully described and explained in the following specification and shown in the accompanying drawings, in which—

Figure 1. is a side elevation of the wheelbarrow embodying my invention; Fig. 2. a plan of the joint between the handle and the body of the wheelbarrow; and Fig. 3, a transverse section of the wheelbarrow through the line $x\ y$, Fig. 1.

In these views A is a side bar of an ordinary wheelbarrow-bed, B an ordinary wheel journaled in bearings at the ends of the side bars, and C the suitably-braced end board attached to the bed.

D is one of the legs attached and suitably braced to the bed near the rear end thereof, and E is a wheel whose hub $c$, Fig. 3, is mounted on a short shaft or gudgeon, $d$, which is formed integrally at the end of the bent axle $a$ and passes through and extends outward from the leg D. The center of the bent axle is bolted or screwed to the lower face of a cross-bar, U, which forms part of the frame of the wheelbarrow, and supports one end of the planking P of the bed. The wheel E is held in place on the gudgeon $d$ by a spring-key passing through the end of the gudgeon, or by any other equivalent means. The gudgeon $d$ may, if desired, be made separate from the axle $a$, which in that case becomes merely a brace; but the making of the gudgeon and axle in one piece gives great additional strength without any additional weight of material, and I therefore prefer that construction.

The side bars, A, extend back to the rear edge of the bed P, (see Fig. 2 and dotted line O, Fig. 1,) and from the rear end of the side bars two handles, A', extend back a suitable distance in the same straight lines as the side bars themselves. The rear end of each side bar and the front end of the corresponding handle are preferably square, and the two surfaces butt the one against the other.

On the top face of the side bar, A, at each side of the bed, and just in front of the junction of the side bar and the corresponding handle, is fastened a flat hinge-leaf, K, provided with a knuckle, K', whose axis is directly over the junction of the side bar and handle, and both leaf and knuckle are preferably of the same width as the side bar and handle.

On the side faces of each of the handles, and at the front ends thereof, are fastened two plates, F, (on the inner and outer faces, respectively,) each of said plates having an upwardly-projecting perforated ear, L, and these plates and the perforated ears are so placed that when the handle is in line with and in contact with the side bar the perforations in the ears L are in line with the axial bore of the knuckle K', and the introduction of a suitable pin, M, completes the hinge and forms a flexible connection of the handle and side bar. (See Figs. 1, 2.) The plate F on the outer face of each handle is provided with an integrally-formed horizontal flange, $f$, extending under and fastened to the lower face of the handle, and also with an integrally-formed bracket, F', extending forward and downward and having a headed pin, J, Figs. 1, 2, set in its outer face near its lower front angle, and a bar, G, is pivoted on a pin, R, set in the outer face of the side bar, A. The bar G is formed with a slot, H, whose width is slightly greater than the diameter of the shank of the pin J, but less than the diameter of the head of said pin, and a series of rectangular notches, I, extend upward from the slot H and practically at right angles thereto, and are of such width as to admit the shank but not the head of said pin J.

Near the center of the bar G is a semicircular notch, I', extending upward from the slot H, and at this point the head of the pin J can pass freely through the bar.

When the handle A' is down and in line with the side bar, A, the shank of the pin J is in the notch I nearest the pin R, and the rectangular form of the notch locks the pin securely and holds the handle firmly in place. If the bar G be raised, however, until the pin J is freed from the notch in which it rests, the handle may be raised, swinging about the hinge-pin M as a center, the pin J sliding in the slot H as the handle rises. When the pin J reaches the second notch, the bar G will again drop down, and the handle will be locked in a new position, and this process may be continued until the handle is vertical and the shank of the pin J is in the notch farthest from the pivot R, as shown in dotted lines in Fig. 1.

If desired, the pin J may be completely freed from the bar G by bringing the head of the pin into the opening I' and swinging the bar outward. When the pin is so freed, the handle may be swung forward one hundred and eighty degrees from the working position shown in full lines in Fig. 1 and laid on the bed of the wheelbarrow.

The length of the legs D and the size of the wheels E are such that when the handles A' are in their lowest position and in line with the side bars, A, the device shown operates the same as an ordinary wheelbarrow, and, in moving it and wheeling it from place to place, the wheels E are lifted from the ground and the weight is borne by the wheel B. When the handles A' stand at an angle with the side bars, (as in the position shown in dotted lines in Fig. 1,) the load rests on all the wheels and the wheelbarrow is converted into a hand-cart.

Two wheels may be substituted for the single wheel B, if desired, and the adjustable handles A' will have the same function, precisely as in the three-wheeled barrow shown in the drawings.

The wheels E may be dispensed with, if desired, leaving the bed, legs, and front wheel of an ordinary wheelbarrow; but in that case the adjustable handles will be useful principally to save space in packing for shipment, or to economize room when loaded—as, for instance, when it is desired to raise loaded wheelbarrows on an elevator, or in other similar situations.

It is evident that the form of the hinges used to connect the handles with the body of the wheelbarrow may be greatly varied, and I do not, therefore, desire to limit my invention to the use of the particular form of connection shown and described; but, Having described my invention and explained its operation, what I claim as new, and desire to secure by Letters Patent, is—

1. The combination, with the body of a cart or wheelbarrow, of a handle or handles hinged thereto, and means, substantially as shown and described, whereby the handles may be rigidly secured at any desired angle to said body, substantially as and for the purpose set forth.

2. The combination of the side bar, A, handle A', plate K, attached to the side bar and provided with knuckle K', plates F F' Q, attached to the handle, and pivot M, connecting said plates and the knuckle K', pin J, attached to the plate F F', and swinging bar G, notched and slotted as described and shown, and co-operating with said pin J, substantially as and for the purpose set forth.

3. The combination of the side bars, A, wheel B, legs D, wheels E, swinging handles A', and means, substantially as shown and described, for setting the handles at any desired angle with the bed, substantially as and for the purpose set forth.

In testimony whereof I have signed this specification in the presence of two subscribing witnesses.

HOMER W. KNOWLTON.

Witnesses:
F. W. BRAINERD,
WALLACE GREENE.